United States Patent [19]

Fennema

[11] Patent Number: 5,220,546
[45] Date of Patent: Jun. 15, 1993

[54] OPERATING OPTICAL DISK DRIVES INCLUDING CALIBRATING A TRACKING ERROR SIGNAL

[75] Inventor: Alan A. Fennema, Tucson, Ariz.

[73] Assignee: International Business Machines Corporation, Armonk, N.Y.

[21] Appl. No.: 589,710

[22] Filed: Sep. 28, 1990

[51] Int. Cl.$^5$ .............................................. G11B 17/22
[52] U.S. Cl. ................................... 369/32; 360/77.08; 360/77.03
[58] Field of Search ............ 369/32; 360/77.08, 77.04, 360/77.06, 77.05, 77.03

[56] References Cited

U.S. PATENT DOCUMENTS

| | | | |
|---|---|---|---|
| 4,914,725 | 4/1990 | Belsar et al. | 360/77.08 |
| 4,942,564 | 7/1990 | Hofer et al. | |
| 5,065,263 | 11/1991 | Yoshida et al. | 360/77.04 |
| 5,090,002 | 2/1992 | Chow et al. | 369/32 |
| 5,121,374 | 6/1992 | Barton et al. | 369/32 |
| 5,134,602 | 7/1992 | Baca et al. | 369/32 |
| 5,136,441 | 8/1992 | Kobayashi | 369/32 |

FOREIGN PATENT DOCUMENTS

| | | |
|---|---|---|
| 0381394 | 8/1990 | European Pat. Off. |
| 0388519 | 9/1990 | European Pat. Off. |
| 3931500 | 9/1989 | Fed. Rep. of Germany |
| 63-37828 | 2/1988 | Japan |

OTHER PUBLICATIONS

IBM Technical Disclosure Bulletin, vol. 31, No. 11, Apr. 1989, New York US pp. 426-429; "Feed Forward Track Following".

Primary Examiner—Robert J. Pascal
Assistant Examiner—Tan Dinh
Attorney, Agent, or Firm—H. F. Somermeyer

[57] ABSTRACT

An optical disk recorder has a fine actuator which holds an objective lens and which is movably mounted on a head carriage. Servo systems connected to the head carriage and the fine actuator cause the fine actuator to seek and track follow based upon signal recovered from a disk while the head carriage is caused to follow the motions of the fine actuator. A tracking error signal is generated indicating the relationship of the beam supplied through the objective lens with respect to tracks on the record medium. An RPE signal (relative position error) is generated by an RPE detector which indicates the relationship of the relative motion of the fine actuator to the head carriage. Both the RPE and TES are calibrated as to offset and as to gain for providing a more precise servo positioning system.

6 Claims, 4 Drawing Sheets

Fig. 8

OPERATING OPTICAL DISK DRIVES INCLUDING CALIBRATING A TRACKING ERROR SIGNAL

FIELD OF THE INVENTION

The present invention relates to optical disk drives and more particularly to servo positioning systems used in such optical disk drives.

BACKGROUND OF THE INVENTION

An important part of operating optical disk drives is the precision needed in its servo positioning system. A tracking error signal derived from the relationship of an objective lens to a set of tracks on an optical disk is the independent input to servo positioners. This indication of relative position of the light beam (objective lens) relative to the tracks on the disk can be in error because of misadjustment of optical detectors or other elements resulting in TES amplitude and off-set errors. Such errors detract from the precision of the operation of the servo positioning system. Optical characteristics as well as variations in track geometries on some optical disk also contribute to such errors. It is desired to provide a means for compensating or accommodating such variations in optical disk drives for ensuring the maintenance of servo positioning precision.

Another error aspect for servo position precision is a dynamic change in the relationship of the beam to the optical axis of the objective lens. During certain motions seeking and track following, the center of the beam is off axis from the optical axis of the objective lens. This causes a refraction resulting in a position indicating error. It is also desired to compensate for such dynamic changes in the beam position with respect to the optical axis of the objective lens.

SUMMARY OF THE INVENTION

In accordance with the invention, a tracking error signal is calibrated to the variations of an optical disk drive for effecting a steady state calibration. The steady state calibration include gain and offset of the tracking error signal. Once the tracking error signal is calibrated, the gain and off-set is inserted into the servo positioning system for effecting compensation for such errors. Following the steady state calibration, a dynamic calibration for accommodating laser beam offset from the optical axis of the objective lens, a measurement system measures the relationship of the objective lens to a reference position along an axis transfers to the longitudinal direction of the track. This dynamic change is calibrated both as to signal amplitude and offset. All of the amplitude gain and offsets are combined in the servo positioning system for comparison with a reference signal to precisely control the objective lens motions.

The foregoing and other objects, features and advantages of the invention will be apparent from the following more particular description of preferred embodiments of the invention, as illustrated in the accompanying drawings.

DETAILED DESCRIPTION OF THE DRAWINGS

Figure 1:
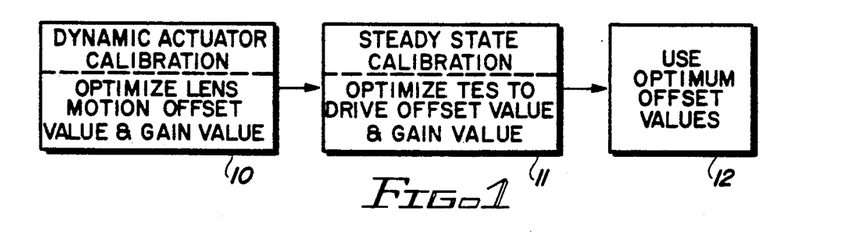
FIG. 1 is a simplified block-diagram showing the functions effected in practicing the present invention.

Referring now more particularly to the appended drawing, like numerals indicate like parts and structural features in the various figures. A broad aspect of the present invention is illustrated in FIG. 1 wherein the dynamic actuator calibration step 10 optimizes the effects of dynamic changing of the relationship of the optical axis of lens 45 (FIG. 2) to the center of the laser beam passing through the objective lens. When the dynamic calibration occurs at step 10 before the steady state calibration 11, a more precise control of the optical disk drive is effected. The relationship of the objective lens to the center of the beam is best controlled by both offset and gain values.

The steady state calibration step 11 optimizes the tracking error signal (TES) of the optical disk drive to drive-fixed error-inducing characteristics. This calibration results in both a gain and offset value being generated for operating the servo positioning system of the optical disk drive. Such steady state calibration compensates for variations in the physical positioning of optical elements, detectors, and the like and can compensate for some variations in optical disk. Such variations will occur more frequently when an optical disk is removably mounted in the optical disk drive, i.e, disk parameters will vary from disk to disk. Finally, at machine-step 12 the calibrated values of offset and gain are used in the data storing and retrieval. operations of the optical disk drive.

Figure 2:
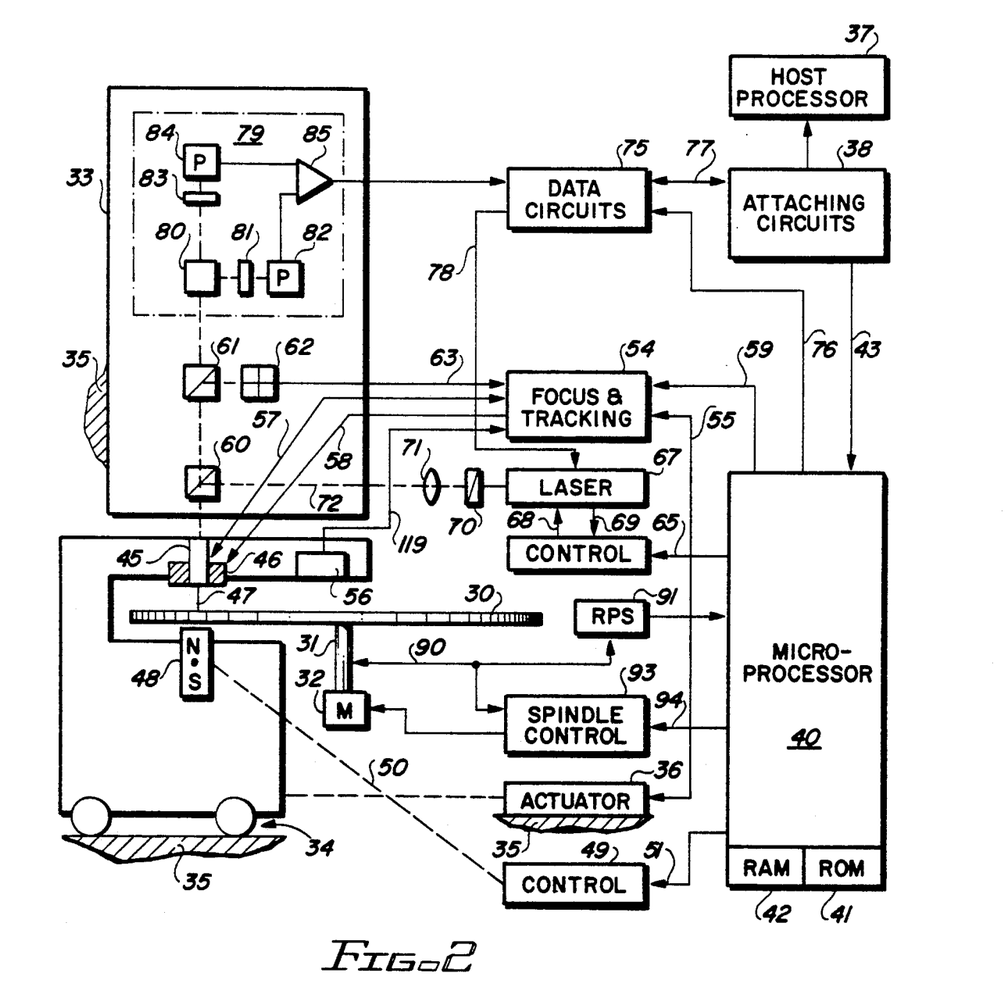
FIG. 2 illustrates in simplified form an optical disk drive in which the invention is advantageously practiced.

Before going into the details of how the calibration and use of the gain and offset values are effected in accordance with the present invention, the environment in which the present invention is advantageously practiced is shown in FIG. 2. A magnetooptic record disk 30 is mounted for rotation on spindle 31 by motor 32. Optical portion 33 is mounted on frame 35. A headarm carriage 34 moves radially of disk 30 for carrying an objective lens 45 from track to track. A frame 35 of recorder suitably mounts carriage 34 for reciprocating radial motions. The radial motions of carriage 34 enable access to any one of a plurality of concentric tracks or circumventions of a spiral track for recording and recovering data on and from the disk. Linear actuator 36 suitably mounted on frame 35, radially moves carriage 34 for enabling track accessing. The recorder is suitably attached to one or more host processors 37, such host processors may be control units, personal computers, large system computers, communication systems, image signal processors, and the like. Attaching circuits 38 provide the logical and electrical connections between the optical recorder and the attaching host processors 37.

Microprocessor 40 controls the recorder including the attachment to the host processor 37. Control data, status data, commands and the like are exchanged between attaching circuits 38 and microprocessor 40 via bidirectional bus 43. Included in microprocessor 40 is a program or microcode-storing, read-only memory (ROM) 41 and a data and control signal storing random-access memory (RAM) 42.

The optics of the recorder include an objective or focusing lens 45 mounted for focusing and radial tracking motions on headarm 33 by fine actuator 46. This actuator includes mechanisms for moving lens 45 toward and away from disk 30 for focusing and for radial movements parallel to carriage 34 motions; for example, for changing tracks within a range of 100 tracks so that carriage 34 need not be actuated each time a track adjacent to a track currently being accessed is to be accessed. Numeral 47 denotes a two-way light path between lens 45 and disk 30.

In magnetooptic recording, magnet 48 in a constructed embodiment (magnet 48 is an electromagnet) provides a weak magnetic steering field for directing the remnant magnetization direction of a small spot on disk 30 illuminated by laser light from lens 45. The laser light spot heats the illuminated spot on the record disk to a temperature above the Curie point of the magnetooptic layer (not shown, but can be an alloy of rare earth and transitional metals as taught by Chaudhari et al., U.S. Pat. No. 3,949,387). This heating enables magnet 48 to direct the remnant magnetization to a desired direction of magnetization as the spot cools below the Curie point temperature. Magnet 48 is shown as oriented in the "write" direction, i.e., binary ones recorded on disk 30 normally are "north pole remnant magnetization". To erase disk 30, magnet 48 rotates so the south pole is adjacent disk 30. Magnet 48 control 49, which is operatively coupled to rotatable magnet 48 as indicated by dashed line 50, controls the write and erase directions. Microprocessor 40 supplies control signals over line 51 to control 49 for effecting reversal of the recording direction.

It is necessary to control the radial position of the beam following path 47 such that a track or circumvolution is faithfully followed and that a desired track or circumvolution is quickly and precisely accessed. To this end, focus and tracking circuits 54 control both the coarse actuator 36 and fine actuator 46. The positioning of carriage 34 by actuator 36 is precisely controlled by control signals supplied by circuits 54 over line 55 to actuator 36. Additionally, the fine actuator 46 control by circuits 54 is exercised through control signals travelling to fine actuator 46 over lines 57 and 58, respectively for effecting respective focus and track following and seeking actions. Sensor 56 senses the relative position of fine actuator 46 to headarm carriage 33 to create a relative position error (RPE) signal. Line 57 consists of two signal conductors, one conductor for carrying a focus error signal to circuits 54 and a second conductor for carrying a focus control signal from circuits 54 to the focus mechanisms in fine actuator 46.

The focus and tracking position sensing is achieved by analyzing laser light reflected from disk 30 over path 47, thence through lens 45, through one-half mirror 60 and to reflected by half-mirror 61 to a so-called "quad detector" 62. Quad detector 62 has four photoelements which respectively supply signals on four lines collectively denominated by numeral 63 to focus and tracking circuits 54. Aligning one axis of the detector 62 with a track center line, track following operations are enabled. Focusing operations are achieved by comparing the light intensities detected by the four photoelements in the quad detector 62. Focus and tracking circuits 54 analyze the signals on lines 63 to control both focus and tracking.

Recording or writing data onto disk 30 is next described. It is assumed that magnet 48 is rotated to the desired position for recording data. Microprocessor 40 supplies a control signal over line 65 to laser control 66 for indicating that a recording operation is to ensue. This means that laser 67 is energized by control 66 to emit a high-intensity laser light beam for recording; in contrast, for reading, the laser 67 emitted laser light beam is a reduced intensity for not heating the laser illuminated spot on disk 30 above the Curie point. Control 66 supplies its control signal over line 68 to laser 67 and receives a feedback signal over line 69 indicating the laser 67 emitted light intensity. Control 68 adjusts the light intensity to the desired value. Laser 67, a semiconductor laser, such as a gallium-arsenide diode laser, can be modulated by data signals so the emitted light beam represents the data to be recorded by intensity modulation. In this regard, data circuits 75 (later described) supply data indicating signals over line 78 to laser 67 for effecting such modulation. This modulated light beam passes through polarizer 70 (linearly polarizing the beam), thence through collimating lens 71 toward half mirror 60 for being reflected toward disk 30 through lens 45. Data circuits 75 are prepared for recording by the microprocessor 40 supplying suitable control signals over line 76. Microprocessor 40 in preparing circuits 75 is responding to commands for recording received from a host processor 37 via attaching circuits 38. Once data circuits 75 are prepared, data is transferred directly between host processor 37 and data circuits 75 through attaching circuits 38. Data circuits 75, also ancillary circuits (not shown), relating to disk 30 format signals, error detection and correction and the like. Circuits 75, during a read or recovery action, strip the ancillary signals from the readback signals before supply corrected data signals over bus 77 to host processor 37 via attaching to 38.

Reading or recovering data from disk 30 for transmission to a host processor requires optical and electrical processing of the laser light beam from the disk 30. That portion of the reflected light (which has its linear polarization from polarizer 70 rotated by disk 30 recording using the Kerr effect) travels along the two-way light path 47, through lens 45 and half-mirrors 60 and 61 to the data detection portion 79 of the headarm 33 optics. Half-mirror or beam splitter 80 divides the reflected beam into two equal intensity beams both having the same reflected rotated linear polarization. The half-mirror 80 reflected light travels through a first polarizer 81 which is set to pass only that reflected light which was rotated when the remnant magnetization on disk 30 spot being accessed has a "north" or binary one indication. This passed light imprnge on photocell 82 for supplying a suitable indicating surge to differential amplifier 85. When the reflected light was rotated by a "south" or erased pole direction remnant magnetization, then polarizer 81 passes no or very little light resulting in no active signal being supplied by photocell 82. The opposite operation occurs by polarizer 83 which passes only "south" rotated laser light beam to photocell 84. Photocell 84 supplies its signal indicating its received laser light to the second input of differential amplifier 85. The amplifier 85 supplies the resulting difference signal (data representing) to data circuits 75 for detection. The detected signals include not only data that is recorded but also all of the so-called ancillary signals as well. The term "data" as used herein is intended to include any and all information-bearing signals, preferably of the digital or discrete value type.

The rotational position and rotational speed of spindle 31 is sensed by a suitable tachometer or emitter sensor 90. Sensor 90, preferably of the optical-sensing type that senses dark and light spots on a tachometer wheel (not shown) of spindle 31, supplies the "tach" signals (digital signals) to RPS circuit 91 which detects the rotational position of spindle 31 and supplies rotational information-bearing signals to microprocessor 40. Microprocessor 40 employs such rotational signals for controlling access to data storing segments on disk 30 as is widely practice the magnetic data storing disks. Additionally, the sensor 90 signals also travel to spindle speed control circuits 93 for controlling motor 32 to rotate spindle 31 at a constant rotational speed. Control 93 may include a crystal-controlled oscillator for controlling motor 32 speed, as is well known. Microprocessor 40 supplies control signals over line 94 to control 93 in the usual manner.

Figures 3, 4A:
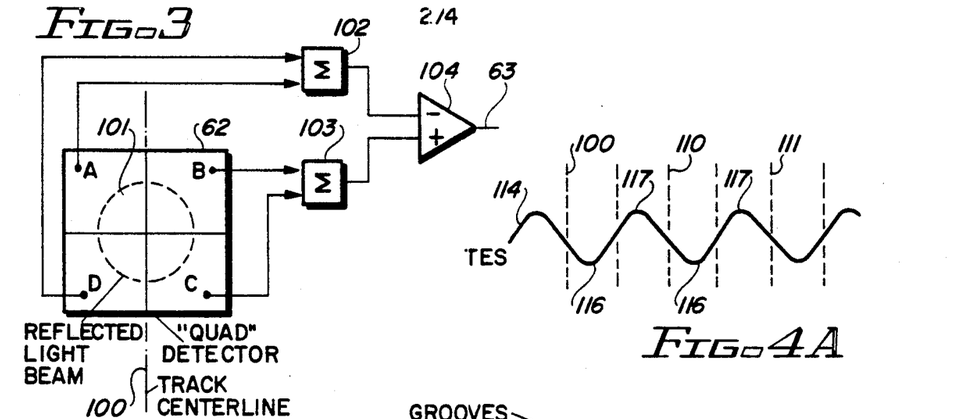
FIG. 3 illustrates generation of a tracking error signal (TES) in an optical disk drive.
FIGS. 4 and 4A illustrate the spatial relationships between a grooved optical disk record member and a TES as generated by the FIG. 3 illustrated circuit.
Figure 4:
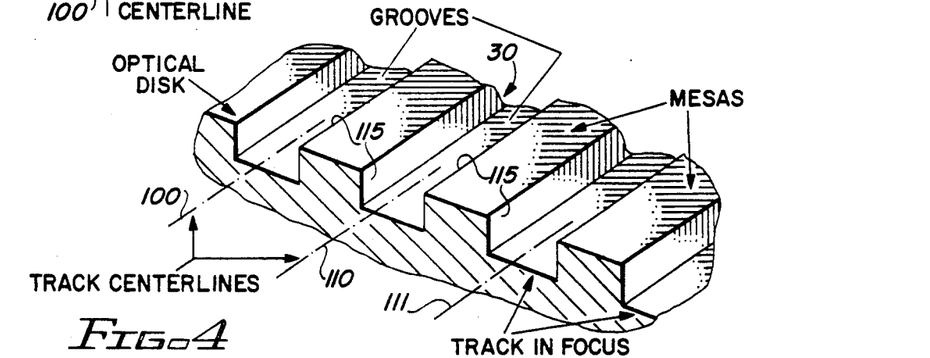

Referring next to FIGS. 3 and 4, the generation of TES is described. Detector 62 has four independent photo-responsive elements A, B, C and D. For generating a tracking error signal TES on line 63, the elements A and D are connected to analog current summing circuit 102 to supply the sum signal A+D to the positive input of differential amplifier 104. Similarly, elements B and C have their output signals connected to a second circuit summing circuit 103, which, in turn, supplies its sum signal B+C to the negative input of differential amplifier 104. The difference between the current sums of A+D and B+C provide the tracking error signal on line 63. Detector 62 has line 100 separating the element pairs A and D, and the element pairs B and C along a track center line being followed, such as the track center line 100 of FIG. 4. The recording tracks can be located either in the grooves, as shown, or the mesa's (FIG. 4). When recording is on the mesa's, then track following occurs on a mesa. During track following, the relative position of a track center line 100, 110 or 111 will move with respect to the elements A, B, C and D, thereby providing different light intensities to the element pairs for generating a tracking error signal truly indicative of the spatial relationship of the beam 47, with respect to a track being followed, for example, at a track center, the reflected laser beam impingement 100 on detector 62 is centered, as seen in FIG. 3. During track seeking, TES 165 is generated as a sine wave signal 114 as best seen in FIG. 4.

FIG. 4 shows an abbreviated portion of the disk 30 wherein the tracks are shown as being aligned with the grooves of the grooved media. The grooves are concentric circles on disk 30, shown as straight lines for purposes of illustration only. Track center lines lie along the center of the respective grooves. As the light beam impinges upon the medium 30, and is focused to the tracks in the grooves, the maximum reflection light intensity is provided to the detector 62 as indicated by dashed line circle 101 (FIG. 3). As the beam moves crosswise of the track, the intensity of the light diminishes and through a zero axis crossing at the vertical boundaries in the grooves and the mesas, reaching positive peaks 117 and negative peaks 116 at the groove-mesas boundaries 115.

In accordance with the invention, the difference in amplitudes of the positive and negative peaks 117 and 116 are compared at a plurality of points in each track and along different tracks. The absolute amplitude difference is termed the TES offset while the TES amplitude is the sum of the two peaks. It is desired to reduce the TES offset to a minimum and maintain the amplitude to be not greater than a predetermined value and not less than a second predetermined value.

Figure 5:
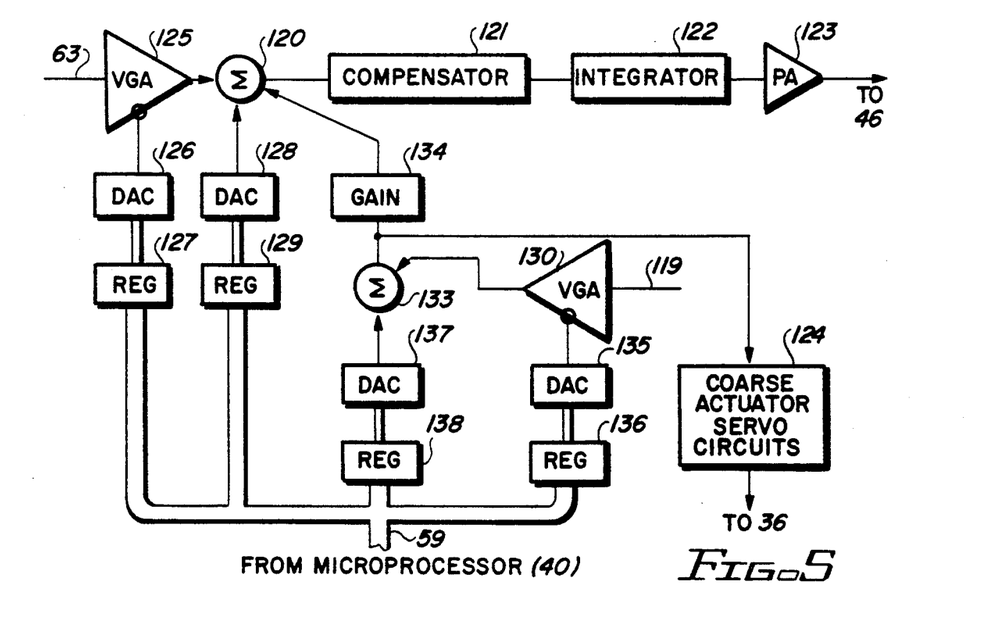
FIG. 5 is a simplified block-diagram showing a servo positioning system usable in the FIG. 2 illustrated optical disk drive and showing applications of the gain and offset controls of the present invention.

The application of gain and offset controls in the FIG. 2 illustrated optical disk drive is shown in abbreviated form in FIG. 5. The tracking error signal, TES is received over line 63. The usual summation circuit 120 compares the reference signal received over line 131 for either tracking or seeking with the TES for generating an error signal used to create a drive signal for bringing the TES back to the reference signal on line 131. A compensator 121 of usual design couples the summation circuit 120 to integrator 122 thence to power amplifier 123. Power amplifier 123 supplies its signal to fine actuator 46 (FIG. 2). The output signal of later described sum circuit 133 is supplied to coarse actuator servo circuits 124 as an adjusted RPE signal which provides the drive signal to actuator 36 such that the head carriage 34 follows the motions of fine actuator 46. This action servos the RPE signal to zero.

In accordance with the invention, TES gain and offset inputs are supplied to summation circuit 120; it is to be understood that summation circuit 120 may take many forms, no limitation to a separate summation circuit is intended. A variable gain amplifier VGA 125 couples line 63 to summation circuit 120. The TES gain control is provided by digital to analog converter DAC 126 as controlled by the numeral value stored in register REG 127. Microprocessor 40 supplies the information to register 127 over cable 59. The value in register 127 is that generated during the later-described calibration, as will become apparent. The TES offset is fed directly into summation circuit 120 by DAC 128. DAC 128 supplies a amplitude value corresponding to the numerical value stored in register 129 by microprocessor 40. The DAC 126 and 128 provide the use of the gain and offset values generated in step 10 of FIG. 1. It is to be understood that other subsequent changes to the offset and gain values may be effected without departing from the spirit of the present invention.

RPE sensor 56 output RPE signal is calibrated in step 11 of FIG. 1. Results of that calibration are applied to the RPE signal supplied over line 119 from RPE sensor 56. Variable gain amplifier VGA 130 amplifies the RPE signal in accordance with a gain control provided by DAC 135 which operates in accordance with the numerical value stored in register 136 by microprocessor 40. Summation circuit 133 receives the gain adjusted RPE signal and combines it with the RPE signal supplied by DAC 137 in accordance with the numerical value stored in register 138 as supplied by microprocessor 40. Summation circuit 133 supplies the summation of the two inputs from BGA 130 and DAC 137 through a level shifting or gain circuit 134 to summation circuit 120.

From all of the above it is seen that the TES calibration and the RPE calibration is applied not only to the fine actuator 46 but carried through to the coarse actuator 36 for providing a precise servo positioning operation within the optical disk drive.

Figure 6:
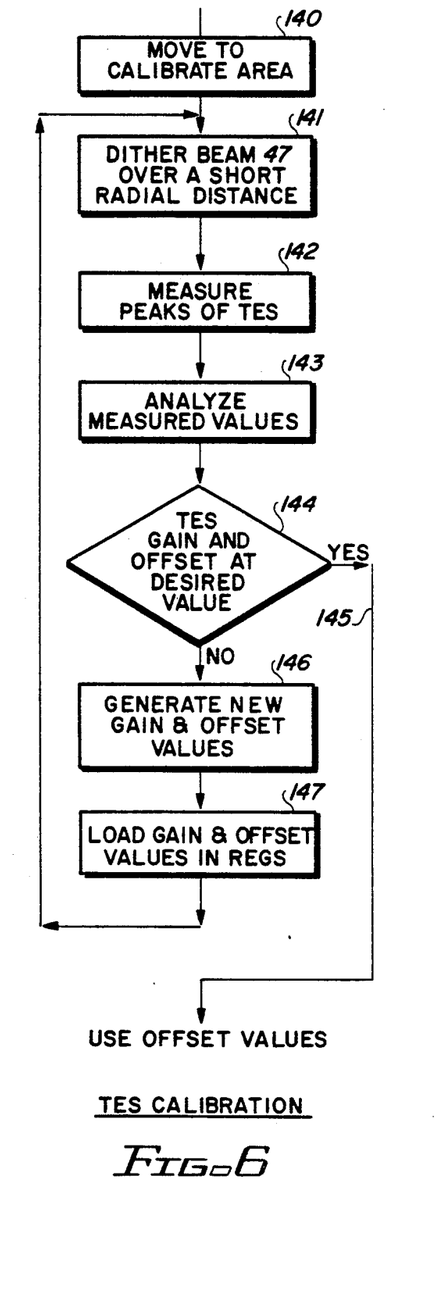
FIG. 6 is a machine-operations chart showing calibration of TES.

Referring next to FIG. 6, the use of TES in the steady state calibration is described. At machine-step 140, fine actuator 46 is moved for causing of the laser beam to scan a calibration area. The calibration area can be either a non-data area or data area. At machine-step 141 the beam 47 is dithered radially over a relatively short distance. Such a relatively short distance is much less than the range of radial motion of fine actuator 46, such as not greater than 10 percent of the motion. This means that from a center track the dither will be limited to less than a 10 track scan, preferably three or four tracks. During the dithering operation, at machine step 142, the peaks of the TES are measured and stored as will be later explained with respect to FIG. 8. To obtain a suitable set of peak amplitude measurements may require taking several samples from each of the tracks being scanned at a plurality of circumferential positions. The "measured" values to be used in calculating gain and offset compensation values are obtained by subtracting the absolute amplitude of positive peaks from the absolute amplitude of negative peaks. This subtraction yields a signal offset value having a sign indicating which of the peaks have a greater absolute amplitude. This calculation results in an offset to be used for setting DAC 128 of FIG. 5. In a similar manner, the absolute amplitude value is of the positive and negative peaks are added together for getting a TES gain factor. The design of each disk drive will have a desirable TES amplitude value. Accordingly, the measured TES amplitude is compared with a desired amplitude. The signed difference between the measured TES amplitude and the desired amplitude is used to control the gain of VGA 125 during servo positioning actions. The contents of register 127 reflect the difference between a desired TES amplitude and the measured TES amplitude.

After analyzing the measured values at machine step 143, microprocessor 40 at step 144 determines whether or not the measured amplitude and measured offsets are at a desired value. If yes, then program path 145 is followed for using the measured offset values for both the TES gain and offset. However, when the values are not at a desired level, which can be empirically determined, then new gain and offset values are generated at machine-step 146 for both the DAC 128 and DAC 126. At machine-step 147, those calculated values for gain and offset are loaded into the registers 126 and 128. Then machine-steps 142 through 144 are repeated until both of the values in the DACs 126 and 128 result in a TES having a minimum offset and amplitude within a range of acceptable values. It should be noted at this point that the dithering is sufficiently small that it can be considered for purposes of this calibration that the laser beam going over path 47 (FIG. 2) is substantially at the optical axis of the objective lens 45.

Figure 7:
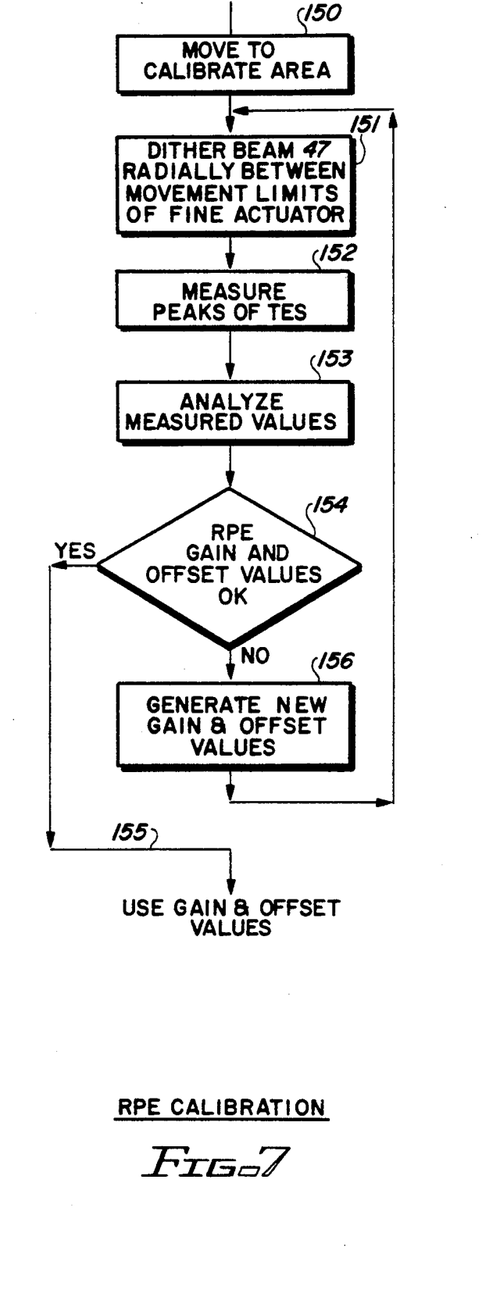
FIG. 7 is a machine-operations chart showing calibration of the relative position error indicative of off axis of the laser beam and the optical axis of a objective lens in the FIG. 2 illustrated optical disk drive.
Figure 8:
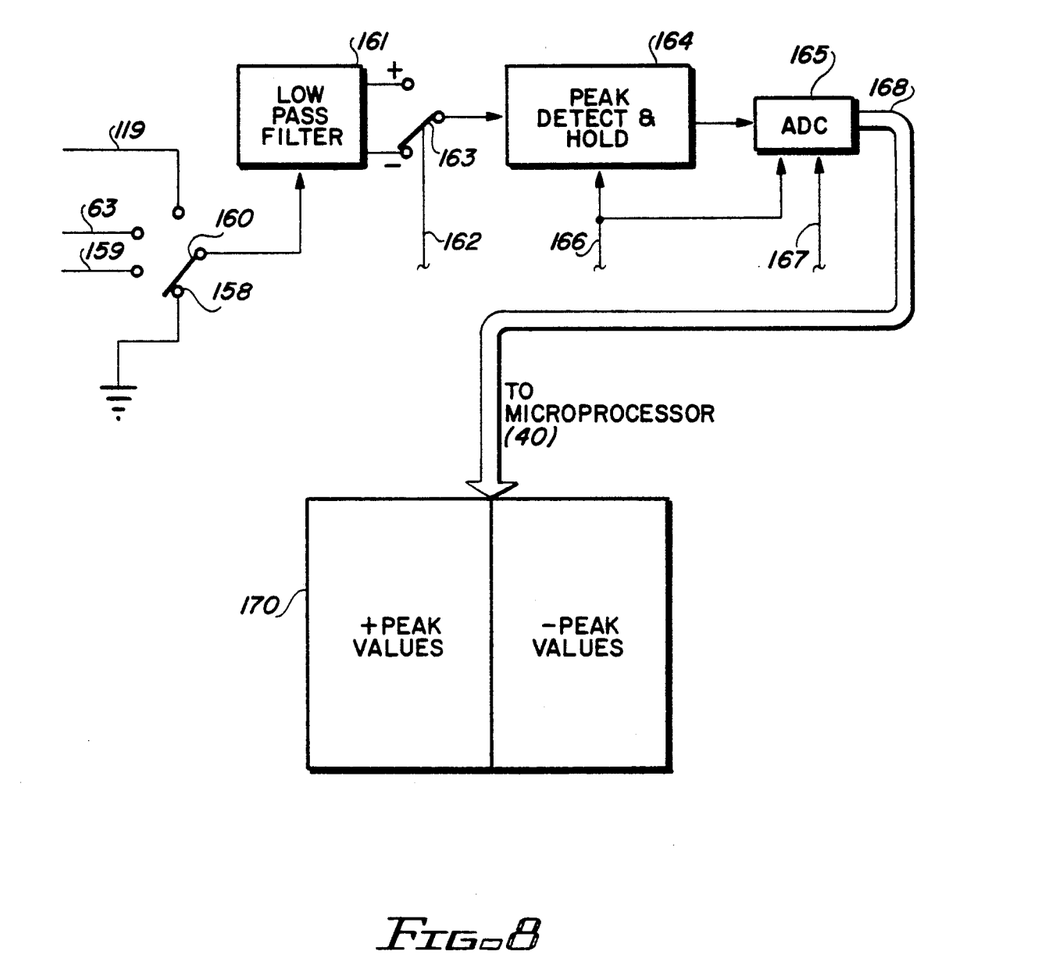
FIG. 8 is a block-diagram and schematic flow diagram showing calibration measurement techniques used in the FIG. 6 and 7 illustrated machine-operations charts.

Referring next to FIG. 7, the dynamic calibration of step 11 in FIG. 1 is described. At machine-step 150, the laser beam on path 47 is moved to a calibrate area, is not already there. Then at machine-step 151, the beam 47 is dithered radially between the movement limits (such as 130 tracks) of the fine actuator 46 such that the maximum refraction of the beam 47 when it passes through the lens 45 will occur. During the dithering, at machine-step 152 the absolute value of the RPE signal is measured and stored as shown in FIG. 8. At machine-step 153, the measured values are analyzed as describe for machine-step 143. At machine step 154 the gain and offset values are compared with empirically determined thresholds for determining whether or not the values causing the RPE to provide a satisfactory signal. If the measurements are satisfactory, then the values for the RPE offset and gain are used as indicated by path 155. If not, new values for the DACs 135 and 137 are generated and inserted into the registers 136 and 138, respectively. Then steps 151 through 154 are repeated until satisfactory results are obtained.

It should be noted that in the beginning of each of the calibrations shown in FIGS. 6 and 7, that an initial nominal value is inserted into the registers for the respective DACs shown in FIG. 5. The FIG. 7 illustrated calibration provides for fine tuning the calibration described in FIG. 6. Further calibration may also be perforated for achieving different results in the optical disk drive of FIG. 2.

Referring next to FIG. 8, the calibration circuit and program control is illustrated. Switch 160 switches any one of a plurality of inputs to the calibration circuits. Line 119 carries the RPE signal for effecting the FIG. 7 illustrated calibration. Line 63 carries TES for effecting the FIG. 6 illustrated calibration. Line 159 can carry other inputs for effecting calibrations of other parameters of the optical disk drive. The fourth terminal 158 is connected to ground reference potential which can be used to calibrate the FIG. 8 illustrated circuit. From switch 160 the signal to be calibrated passes through low pass filter 161. A line 162 signal selects the polarity of the filter output signal for respectively measuring positive and negative peaks of the signal. Peak detector 164 is timed by a signal on line 166 to capture the peak for conversion to digital value by ADC 165. ADC 165 is a typical analog to digital converter. The digitized values of ADC 165 are supplied over cable 168 by the readout signal 167 received from microprocessor 40 for reading the captured peak value into microprocessor 40. Microprocessor 40 is aware of the polarity signal 162 such that the plus peak values received from ADC 165 are stored in the plus peak value column of computer table 170 while the negative peaks are stored in the minus peak values table of table 170. All of the plus and minus peak values in table 170 are accumulated for obtaining a mean value for the respective peak values. Upon getting the mean or average peak value then at machine step 143 or machine step 153 the offset values and the gain amplitude values are calculated as above-described.

While the invention has been particularly shown and described with reference to preferred embodiments thereof, it will be understood by those skilled in the art that various changes in form and details may be made therein without departing from the spirit and scope of the invention:

What is claimed is:

1. In apparatus for operating an optical disk drive, an objective lens movably mounted in the optical disk drive for seeking and tracking motions with respect to signal tracks on an optical record member, comprising:
   a servo positioning means in the optical disk drive coupled to the objective lens for effecting seeking and tracking motions of the objective lens;
   tracking error signal means optically coupled to the record member through the objective lens for sensing the relative position of the lens with respect to tracks on the record member and supplying a tracking-error signal indicative of such relative position;

servo optical disk drive means in the servo positioning means for receiving the tracking-error signal to generate a optical disk drive signal for the servo positioning means to control said seeking and tracking motions, said tracking error signal having positive and negative peaks;

tracking-error-signal-offset-and-gain-control means electrically interposed between the tracking error signal means and the servo drive means, the tracking-error-signal-offset -and-gain-control means for generating a steady-state amplitude-compensating signal and a steady-state offset-compensating signal and for supplying the compensating signals to the servo drive means for adding compensating signals to the tracking error signal to respectively modify the tracking error signal amplitude and offset;

a head carriage in the optical disk drive being relatively movable with respect to the record member in a cross track direction for effecting tracking motions between the objective lens and the record member;

a fine actuator supporting the objective lens and mounted on the head carriage for relative movement wth respect to the head carriage in the cross track direction;

said servo optical disk drive means being coupled to said head carriage and to said fine actuator for effecting said cross track motions;

relative position error sensing means mounted on the head carriage for sensing and electrically indicating a relative position of the fine actuator with respect to the head carriage in said cross track direction in an relative position error signal;

said servo optical disk drive means being coupled to the relative position error sensing means for receiving the relative position error signal for use in effecting said tracking motions;

relative position error offset means electrically interposed between said relative position error sensing means and said servo optical disk drive means for supplying relative position error gain and offset signals for altering the amplitude and offset of the relative position error signal as to gain and offset;

calibration means in the optical disk drive coupled to the servo positioning means, the tracking error signal means, to the servo drive means and to the tracking-error-signal-offset-and -gain-control means for calibrating the amplitude-compensating signal and offset-compensating signal and the relative position error amplitude and offset of the respective tracking error signal and relative position error signals for obtaining a tracking error signal having an offset and amplitude within a predetermined range of amplitudes and signal offsets;

said calibration means having means for measuring and indicting positive and negative amplitude peak values of said tracking error signal;

a digital computer in the calibration means and being connected to the calibration means and to the tracking error signal offset and gain control means or receiving said tracking error signal and for subtracting the amplitude values of the positive peaks from the values of the negative peaks of tracking error signal to calculate the offset and adding the amplitude values of the positive and negative peaks to calculate the tracking error signal amplitude and having means responsive to the calculations to generate offset values for tracking error signal amplitude and relative position error signal amplitude and offset which modify the tracking error signal in the respective variable gain amplifier to have a maximum peak amplitude of a predetermined range of amplitudes and an offset within a predetermined offset range.

2. In apparatus for operating an optical disk drive, an objective lens movably mounted in the optical disk drive for seeking and tracking motions with respect to signal tracks on an optical record member, comprising:

a servo positioning means in the optical disk drive coupled to the objective lens for effecting seeking and tracking motions of the objective lens;

tracking error signal means optically coupled to the record member through the objective lens for sensing the relative position of the lens with respect to tracks on the record member and supplying a track error signal indicative of such relative position;

servo optical disk drive means in the servo positioning means for receiving the TES signal to generate a optical disk drive signal for the servo positioning means to control said seeking and tracking motions; said tracking error signal having positive and negative peaks:

tracking-error-signal-offset-and-gain-control means electrically interposed between the tracking error signal means and the servo drive means, the tracking-error-signal-offset-and -gain-control means for generating a steady-state amplitude-compensating signal and a steady-state offset-compensating signal and for supplying the compensating signals to the servo drive means for adding compensating signals to the tracking error signal to respectively modify the tracking error signal amplitude and offset;

calibration means in the optical disk drive coupled to the servo positioning means, the tracking error signal means, to the servo drive means and to the tracking-error-signal-offset -and-gain-control means for calibrating the compensating signals for obtaining a tracking error signal having a predetermined amplitude and offset;

said servo positioning means including variable gain amplifier means and analog summing means, said variable gain amplifier means receiving the tracking error signal for supplying a modified tracking error signal to the analog summing means;

said tracking error signal-offset-and-gain-control means connected to both said variable gain amplifier and to the analog summing means for supplying the amplitude-compensating signal to the variable gain amplifier and the offset-compensating signal to the analog summing means;

said calibration means having means for measuring and indicating positive and negative amplitude peak values of amplitude peaks in said tracking error signal; and a digital computer in the calibration means and being connected to the calibration means and to the tracking-error -signal-offset-and-gain-control means for receiving said tracking error signal and for subtracting the amplitude values of the positive peaks from the negative peaks of tracking error signal to calculate the offset and adding the amplitude values of the positive and negative peaks to calculate the tracking error signal amplitude and having means responsive to the calculations to generate said amplitude-compensating signal and said offset-compensating signal.

3. The apparatus set forth in claim 1 further including, in combination:

said relative position error offset means including variable gain amplifier means receiving said relative position error signal and the relative position error offset gain signal for changing the amplitude of the relative position error signal, a summing means connected to the variable gain amplifier for receiving the changed amplitude relative position error signal and the relative position error offset signal to generate a summed offset changed relative position error signal and being connected to the servo optical disk drive means for supplying the summed offset changed relative position error signal thereto.

4. The apparatus set forth in claim 3 further including, in combination:

said servo positioning means including a tracking error signal variable gain amplifier means and analog summing means, said tracking error signal variable gain amplifier means receiving the tracking error signal for supplying a modified tracking error signal to he analog summing means;

said tracking error signal offset and gain control means connected to both said tracking error signal variable gain amplifier and to the analog summing means for supplying the tracking error signal amplitude offset signal to the tracking error signal variable gain amplifier and the offset signal to the analog summing means; and said relative position error offset means being connected to he analog summing means for supplying said summed offset changed relative position error signal thereto.

5. The apparatus set forth in claim 4 further including, in combination:

said relative position error offset means further including an amplitude level shifting means electrically interposed between the summing means of the relative position error offset means and the analog summing means.

6. In apparatus for operating a positioning servo of an optical disk optical disk drive having a lens carrying means with two relatively movable means one of which supports and moves an objective lens in a cross track direction of a record member having a plurality of parallel signal tracks extending in a first direction, including, in combination:

tracking error signal means for supplying a tracking error signal that indicates a relative position of the objective lens with respect to a closest one of the tracks, said tracking error signal having positive and negative peaks;

relative position error means for supplying an relative position error signal indicating a relative position of said two relatively movable members in the lens carrying means;

calibration means connected to the tracking error signal means and to the relative position error means for first calibrating the tracking error signal to have an amplitude and offset within respective first predetermined ranges of values and which tend to compensate for steady state error conditions affecting tracking error signal; and to second calibrate the relative position error means such that the relative position error signal has a predetermined amplitude value and offset which effects a tracking error signal having an amplitude and offset in said respective first predetermined ranges of values and which tends to compensate for dynamic errors;

said calibration means having means for measuring and indicating positive and negative amplitude peak values of said tracking error signal; and a digital computer in the calibration means and being connected to the calibration means and to the tracking error signal offset and gain control means for receiving said tracking error signal and for subtracting the amplitude values of the positive peaks from the values of he negative peaks of tracking error signal to calculate the offset and adding the amplitude values of the positive and negative peaks to calculate the tracking error signal amplitude and having means responsive to the calculations to generate offset values for tracking error signal amplitude and relative position error signal amplitude and offset which modify the tracking error signal n the respective variable gain amplifier to have a maximum peak amplitude of a predetermined range of amplitudes and an offset within a predetermined offset range.

* * * * *

UNITED STATES PATENT AND TRADEMARK OFFICE
CERTIFICATE OF CORRECTION

PATENT NO. : 5,220,546
DATED : June 15, 1993
INVENTOR(S) : Alan A. Fennema

It is certified that error appears in the above-identified patent and that said Letters Patent is hereby corrected as shown below:

At column 9, line 50, the words "tracking-error-signal-offset-and    -gain-control" should be --tracking-error-signal-offset-and-gain-control--.

At column 9, line 64, the word "or" should be --for--.

At column 10, line 41, the words "tracking-error-signal-offset    -and-gain-control" should be --tracking-error-signal-offset-and-gain-control--.

At column 10, line 62, the words "tracking-error    -signal-offset-and-gain-control" should be --tracking-error-signal-offset-and-gain-control--.

At column 11, line 26, the word "he" should be --the--.

At column 11, line 35, the word "he" should be --the--.

At column 12, line 35, the word "he" should be --the--.

UNITED STATES PATENT AND TRADEMARK OFFICE
CERTIFICATE OF CORRECTION

PATENT NO. : 5,220,546

DATED : June 16, 1993

INVENTOR(S) : Alan A. Fennema

It is certified that error appears in the above-identified patent and that said Letters Patent is hereby corrected as shown below:

At column 12, line 44, the word "n" should be --in--.

Signed and Sealed this

Seventeenth Day of May, 1994

Attest:

BRUCE LEHMAN

Attesting Officer    Commissioner of Patents and Trademarks